United States Patent
Bex et al.

(10) Patent No.: US 9,550,473 B2
(45) Date of Patent: Jan. 24, 2017

(54) WIPER DEVICE, IN PARTICULAR A MOTOR VEHICLE WINDSHIELD WIPER DEVICE

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 13/976,904

(22) PCT Filed: Nov. 21, 2011

(86) PCT No.: PCT/EP2011/070580
§ 371 (c)(1),
(2), (4) Date: Sep. 10, 2013

(87) PCT Pub. No.: WO2012/089409
PCT Pub. Date: Jul. 5, 2012

(65) Prior Publication Data
US 2013/0340198 A1    Dec. 26, 2013

(30) Foreign Application Priority Data
Dec. 27, 2010  (DE) .......................... 10 2010 064 156

(51) Int. Cl.
*B60S 1/38* (2006.01)
*B60S 1/40* (2006.01)
*B60S 1/04* (2006.01)

(52) U.S. Cl.
CPC .............. *B60S 1/0408* (2013.01); *B60S 1/38* (2013.01); *B60S 1/3851* (2013.01); *B60S 1/3881* (2013.01); *B60S 1/381* (2013.01); *B60S 1/3856* (2013.01); *B60S 1/3889* (2013.01)

(58) Field of Classification Search
CPC ........... B60S 1/38; B60S 1/381; B60S 1/3881; B60S 1/0408; B60S 1/3863; B60S 1/3849; B60S 1/3851; B60S 1/3858; B60S 1/3856
USPC ........................ 15/250.201, 250.43, 250.451
See application file for complete search history.

(56) References Cited

U.S. PATENT DOCUMENTS

| | | | |
|---|---|---|---|
| 2007/0174989 A1 | 8/2007 | Moll et al. | |
| 2008/0301896 A1 | 12/2008 | Shen | |
| 2009/0056049 A1* | 3/2009 | Jarasson | B60S 1/381 15/250.32 |
| 2010/0139026 A1 | 6/2010 | Ku | |

(Continued)

FOREIGN PATENT DOCUMENTS

| CN | 1950242 | 4/2007 |
|---|---|---|
| CN | 2936852 Y * | 8/2007 |

(Continued)

OTHER PUBLICATIONS

International Search Report for Application No. PCT/EP2011/070580 dated Feb. 13, 2012.

*Primary Examiner* — Gary Graham
(74) *Attorney, Agent, or Firm* — Michael Best & Friedrich LLP

(57) ABSTRACT

The invention relates to a wiper device, in particular a motor vehicle windshield wiper device, comprising a wiper strip unit (10), which comprises a wiper strip element (20) having a longitudinal guide channel (12) for guiding a carrier element (14). According to the invention, the longitudinal guide channel (12) comprises a longitudinal opening (16) which extends at least over the majority of the wiper strip element (20).

13 Claims, 4 Drawing Sheets

(56) References Cited

U.S. PATENT DOCUMENTS

| | | | |
|---|---|---|---|
| 2010/0218333 A1* | 9/2010 | Ritt | 15/250.201 |
| 2010/0293737 A1* | 11/2010 | Ollier | B60S 1/3858 15/250.34 |

FOREIGN PATENT DOCUMENTS

| | | | |
|---|---|---|---|
| CN | 101134455 | | 3/2008 |
| CN | 101618710 | | 1/2010 |
| CN | 101643059 | | 2/2010 |
| DE | 10036115 | * | 1/2003 |
| DE | 202006009435 | | 8/2006 |
| DE | 202007018131 | | 3/2008 |
| DE | 212007000044 | | 2/2009 |
| DE | 102008040063 | | 1/2010 |
| DE | 102009014313 | | 9/2010 |
| FR | 2925437 | * | 6/2009 |

\* cited by examiner

WIPER DEVICE, IN PARTICULAR A MOTOR VEHICLE WINDSHIELD WIPER DEVICE

BACKGROUND OF THE INVENTION

A wiper device is already known, in particular a motor vehicle windshield wiper device, having a wiper strip unit which has a wiper strip element with a longitudinal guide channel for guiding a carrier element.

SUMMARY OF THE INVENTION

The invention proceeds from a wiper device, in particular a motor vehicle windshield wiper device, having a wiper strip unit which has a wiper strip element with a longitudinal guide channel for guiding a carrier element.

It is proposed that the longitudinal guide channel comprises a longitudinal opening which extends at least over the greater part of the wiper strip element, as a result of which material and/or production costs can be saved. Here, a "wiper strip unit" is to be understood in this context to mean, in particular, a unit which is provided for connecting a wiper blade adapter to a wiper lip. "Provided" is to be understood, in particular, to mean specially designed and/or equipped. In this context, a "longitudinal guide channel" is to be understood, in particular, to mean a guide channel which extends parallel to a longitudinal direction of the wiper strip unit. The longitudinal guide channel preferably comprises a clearance and at least one channel wall which delimits the clearance. In this context, a "longitudinal direction" is to be understood, in particular, to mean a direction which extends substantially parallel to a longitudinal extent of the wiper strip unit. In this context, a "longitudinal extent" is to be understood, in particular, to mean a greatest possible extent. In this context, "substantially" is to be understood, in particular, to mean a deviation of less than 10°, preferably less than 5°. In this context, an "extent" of an element is to be understood, in particular, to mean a maximum spacing of two points of one perpendicular projection of the element onto a plane. In this context, a "carrier element" is to be understood, in particular, to mean an elastomeric element which has at least an extent which, in a normal operating state, can be changed elastically by at least 10%, in particular by at least 20%, preferably by at least 30% and particularly advantageously by at least 50%, and which generates, in particular, a counterforce which is dependent on a change of the extent, is preferably proportional to the change and counteracts the change. In this context, a "longitudinal opening" is to be understood, in particular, to mean a recess in a channel wall, which recess opens the longitudinal guide channel toward the surrounding area of the longitudinal guide channel in a direction which runs perpendicularly with respect to the longitudinal direction and/or connects the clearance of the longitudinal guide channel to the surrounding area of the longitudinal guide channel perpendicularly with respect to the longitudinal direction. Here, a "wiper strip element" is to be understood in this context, in particular, to mean an element which is provided for connecting a wind deflector element, a carrier element and a wiper lip in a positively locking manner.

Furthermore, it is proposed that the longitudinal guide channel is open toward a receiving region of the wind deflector element, as a result of which a particularly high stability of the wiper device can be achieved. In this context, a "receiving region" is to be understood, in particular, to mean a region, in which, in a mounted state, at least one component is arranged. In this context, a "wind deflector element" is to be understood, in particular, to mean an element which is provided for deflecting a head wind which acts on the wiper blade device and/or for utilizing it to press the wiper lip onto a vehicle windshield. The wind deflector element preferably has at least one concave surface.

If the longitudinal opening extends over the entire longitudinal guide channel, weight and/or material can advantageously be further saved.

It is proposed in a further refinement of the invention that the wiper strip element is produced at least in an extrusion process, as a result of which the wiper strip element can be produced particularly simply and/or inexpensively.

If the wiper device has a wind deflector element which is provided, in a mounted state, for forming a positively locking connection with the wiper strip element in a direction which faces away from the wiper strip element, particularly rapid mounting of the wiper device can be achieved.

Furthermore, it is proposed that the wind deflector element closes at least one fastening means of the wiper strip element toward the outside at least for the greater part, as a result of which particularly simple mounting of the wind deflector element on the wiper strip element can be achieved. In this context, a "fastening means" is to be understood, in particular, to mean an elongate means which is provided for restricting the freedom of movement of a component. The fastening means preferably has a shape which is similar to a barb. The fastening means is particularly preferably configured in one piece with the wiper strip element. In this context, a "greater part" is to be understood, in particular, to mean more than 50%, preferably more than 70% and particularly preferably more than 90%. In this context, "toward the outside" is to be understood, in particular, as pointing away from the wiper device and/or facing a surrounding area of the wiper device. Here, "close" is to be understood in this context, in particular, to mean cover and/or shield and/or engage around. "In one piece" is to be understood, in particular, to mean connected in a material-to-material manner, such as by way of a welding process and/or adhesive bonding process, etc., and particularly advantageously to mean formed integrally, such as by way of production as one casting and/or by way of production in a single-component or multiple-component injection molding process.

In a further refinement of the invention, it is proposed that the wiper strip element has at least two fastening means, the free ends of which point in directions which face away from one another, and which free ends are provided for forming a positively locking connection with the wind deflector element, as a result of which particularly secure fastening of the wind deflector element to the wiper strip unit can be achieved.

Furthermore, it is proposed that the wind deflector element is produced in a coextrusion process, as a result of which the wind deflector element can be produced in a particularly stable and at the same time inexpensive manner.

If the wiper strip unit comprises at least one end cap which is provided for closing off the wiper strip unit in a longitudinal direction, a movement of components of the wiper strip unit in a longitudinal direction can advantageously be avoided.

BRIEF DESCRIPTION OF THE DRAWINGS

Further advantages result from the following description of the drawings. In the drawing, one exemplary embodiment of the invention is shown. The drawings, the description and the claims contain numerous features in combination. A person skilled in the art will expediently also consider the features individually and combine them to form appropriate further combinations.

In the drawings.

DETAILED DESCRIPTION

Figure 1:
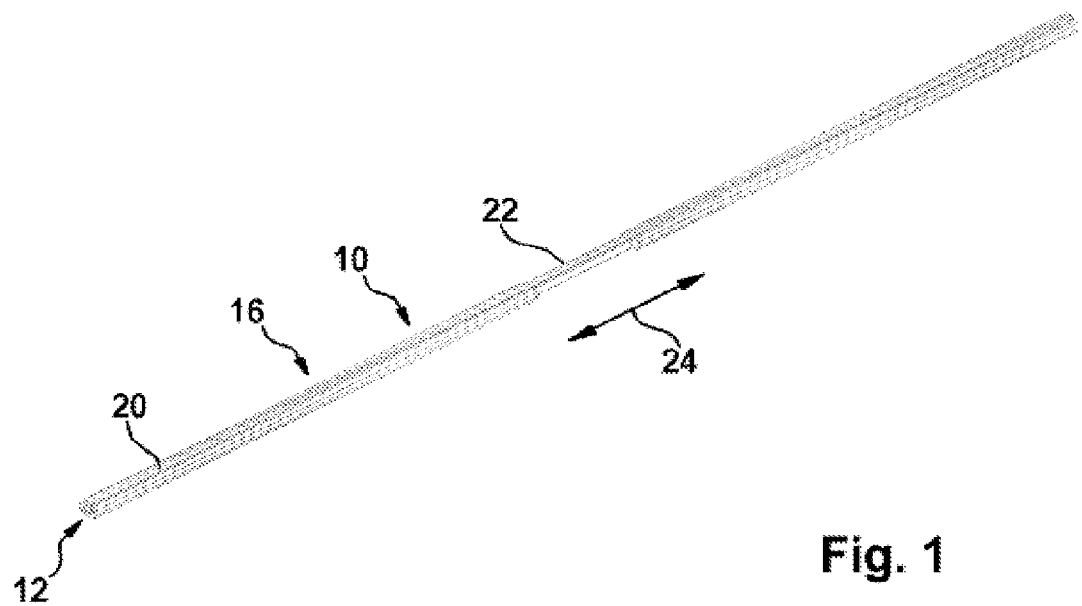
FIG. 1 shows a perspective view of a wiper strip unit of a wiper device.
Figure 5:
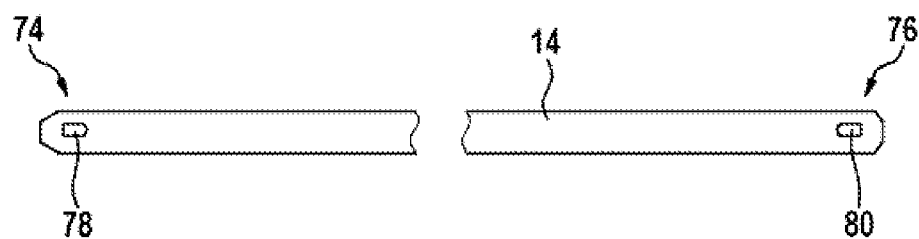
FIG. 5 shows a plan view of a carrier element of the wiper device.

FIG. 1 shows a perspective illustration of a wiper strip unit 10 according to the invention with an elongate wiper strip element 20 which has a longitudinal guide channel 12 for guiding a carrier element 14 (FIG. 5). The longitudinal guide channel 12 comprises a longitudinal opening 16 which extends in the longitudinal direction 24 over the entire longitudinal guide channel 12.

The wiper strip element 20 is produced in one piece from plastic in an extrusion process. In this context, a person skilled in the art will consider various plastics which appear appropriate, such as, in particular, polyethylene, polypropylene, polyamide, polyvinyl chloride and/or polystyrene. Furthermore, the wiper strip element 20 comprises a fastening recess 22 which, as viewed in the longitudinal direction 24, is arranged centrally.

Figure 4:
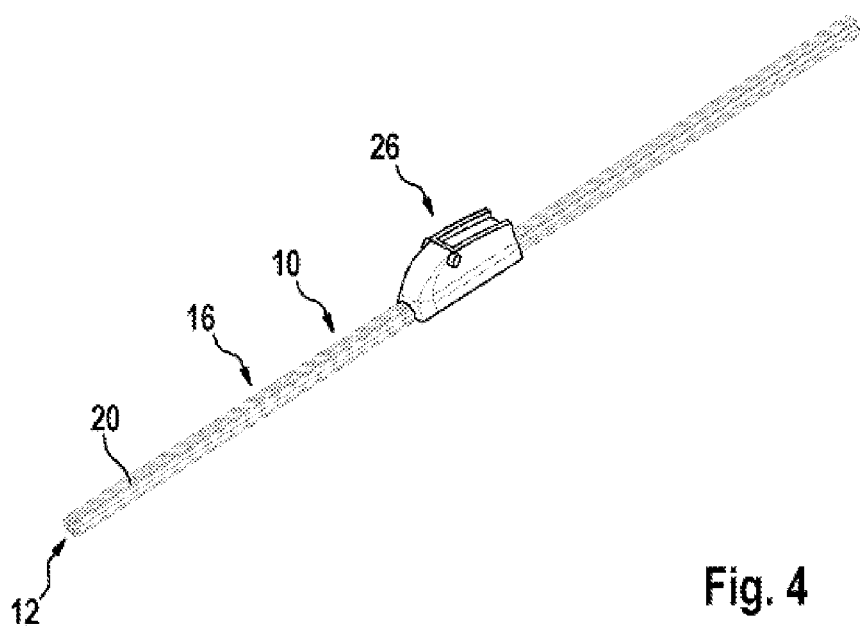
FIG. 4 shows a further perspective view of the wiper device according to FIG. 1 in a first assembly step.

In addition, the wiper device has a wiper blade adapter 26 (FIG. 4) which can be fastened to the wiper strip element 20. Exact positioning of the wiper blade element 26 is given by the fastening recess 22. In order to avoid positioning it the wrong way round, the fastening recess 22 has different lengths on opposite sides of the wiper strip element 20.

Figure 2:
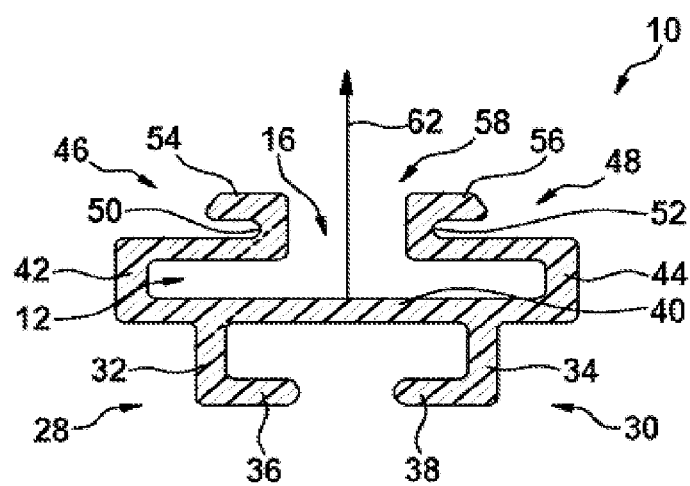
FIG. 2 shows a section through a wiper strip element of the wiper strip unit according to FIG. 1.

FIG. 2 shows a section through the wiper strip element 20, which section runs perpendicularly with respect to the longitudinal direction 24. Two L-shaped guide profiles 28, 30 of the wiper strip unit 10 are arranged on the wiper strip element 20 in order to receive a wiper lip 18. The guide profiles 28, 30 in each case have a side guide 32, 34 and in each case have a vertical guide 36, 38.

The vertical guides 36, 38 in each case enclose an angle of 90° with the side guides 32, 34. Here, the vertical guides 36, 38 point toward one another. Furthermore, the side guides 32, 34 are formed integrally on an intermediate wall 40. The side guides 32, 34 in each case enclose an angle of 90° with respect to the intermediate wall 40.

In order to guide the carrier element 14, side walls 42, 44 of the longitudinal guide channel 12 adjoin the intermediate wall 40. The side walls 42, 44 enclose a right angle with the intermediate wall 40 here and extend, as viewed from the intermediate wall 40, in a direction which is opposite with respect to the side guides 32, 34. The side walls 42, 44 are cut off in the region of the fastening recess 22.

Two L-shaped guide profiles 46, 48 of the wiper strip unit 10 are arranged at an end of the side walls 42, 44 which faces away from the intermediate wall 40. The guide profiles 46, 48 in each case have a side wall 50, 52 and in each case have a fastening means 54, 56 which is similar to a barb. The fastening means 54, 56 in each case enclose an angle of 90° with the side walls 50, 52. Here, the fastening means 54, 56 point in directions which face away from one another at the free ends thereof.

The longitudinal opening 16 is arranged between the side walls 50, 52 and opens the longitudinal guide channel 12 to a receiving region 58 of a wind deflector element 60 in a vertical direction 62. The vertical direction 62 runs perpendicularly with respect to the longitudinal direction 24 and perpendicularly with respect to the intermediate wall 40.

Figure 3:
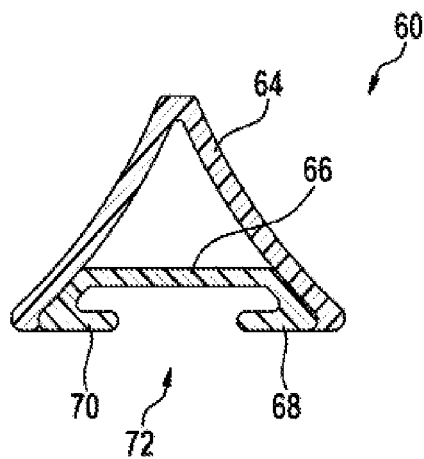
FIG. 3 shows a section through a wind deflector element of the wiper device.

FIG. 3 shows a section through a wind deflector element 60 according to the invention of the wiper device. The wind deflector element 60 is produced in a coextrusion process and has two different materials.

A spoiler element 64 which is configured concavely toward the outside is formed with a material-to-material connection to a spoiler rail 66. Here, the spoiler rail 66 has a greater strength than the spoiler element 64. As a result, friction when pushing the wind deflector element 60 onto the guide profiles 46, 48 can be kept low.

Two fastening means 68, 70 which point toward one another at the free ends thereof are formed integrally on the spoiler rail 66. The fastening means 68, 70 adjoin a receiving region 72 for the fastening means 54, 56 of the wiper strip unit 10. During assembly of the wiper device, the wind deflector element 60 forms a positively locking connection with the wiper strip unit 10.

For assembly, first of all the wiper blade adapter 26 of the wiper device is placed in the vertical direction onto the wiper strip element 20. Here, the wiper blade adapter 26 forms a positively locking connection with the wiper strip unit 10 in the fastening recess 22 and can thus be positioned exactly. In order to secure the wiper blade adapter 26 in the vertical direction 62, a carrier element 14 (FIG. 5) is introduced into the longitudinal guide channel 12 in the longitudinal direction 24.

The carrier element 14 is produced from a spring steel and is provided for shaping the wiper strip unit 10 such that it can be deflected elastically. Furthermore, the carrier element 14 has two end regions 74, 76 which are shaped differently. Two recesses 78, 80 are arranged within the end regions 74, 76.

The mounted carrier element 14 engages into a cutout (not shown) of the wiper blade adapter 26 and is guided therein over the entire length of the wiper blade adapter 26. Here, an elevation which is arranged in the cutout produces friction between the wiper blade adapter 26 and the carrier element 14.

Figure 6:
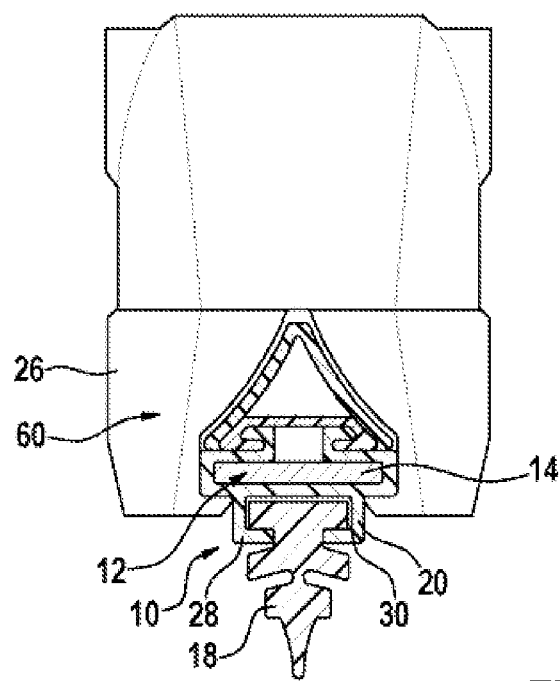
FIG. 6 shows a section through the wiper device.

FIG. 6 shows a section through the wiper strip unit 10 in an assembled state, the sectional plane extending perpendicularly with respect to the longitudinal direction 24. The wiper strip element 20 is connected in a positively locking manner to the wiper blade adapter 26. The carrier element 14 is pushed into the longitudinal guide channel 12.

The wiper lip 18 is pushed in between the guide profiles 28, 30 in the longitudinal direction 24 in a positively locking manner. The wind deflector element 60 forms a positively locking connection with the wiper strip unit 10, by the fastening means 68, 70 of the wind deflector element 60 engaging around the fastening means 54, 56 of the wiper strip element 20 in a positively locking manner. As a result, the fastening means 54, 56 of the wiper strip element 20 are closed off to the outside for the greater part by the wind deflector element 60.

In order to avoid mutual displacement of the wiper strip element 20, the wind deflector element 60 and the wiper lip 18 in the longitudinal direction 24, end caps 82 of different configurations are pushed onto the free ends of the wiper strip element 20. Incorrect mounting of the end caps 82 can be avoided by way of the different configurations of the end regions 74, 76 of the carrier element 14.

Figure 7:
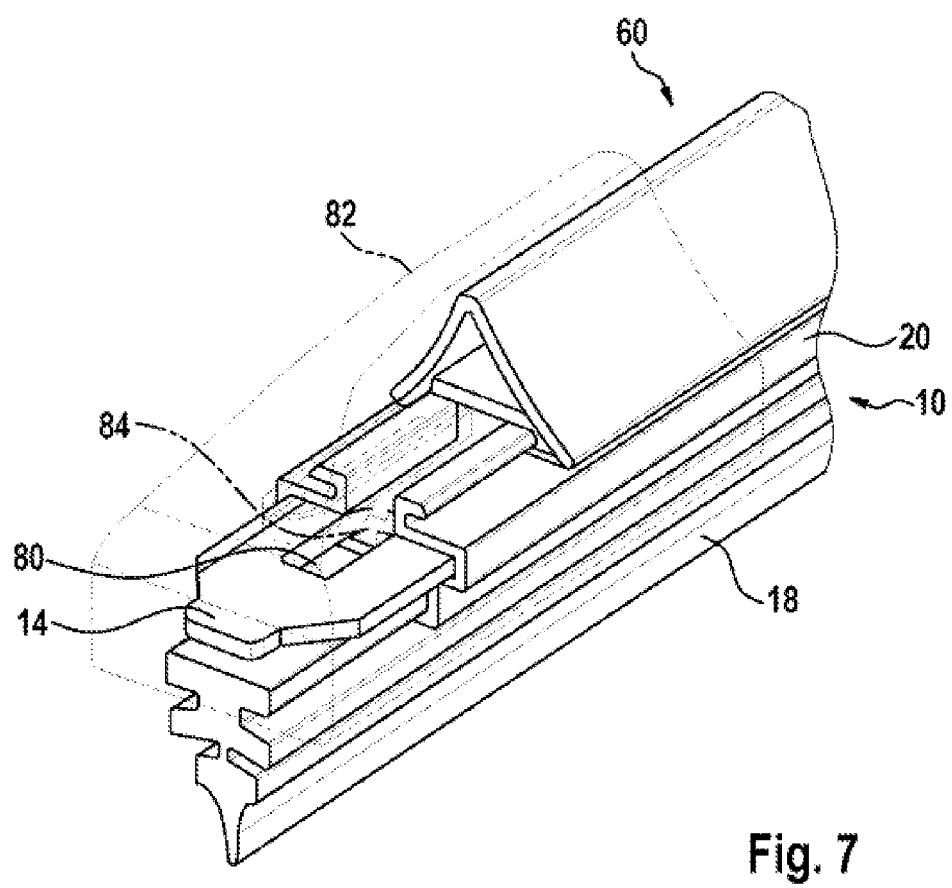
FIG. 7 shows a perspective view of the wiper strip unit in an end region.

Here, as shown in FIG. 7, the end cap 82 forms a positively locking connection with the wiper strip element 20 and the carrier element 14 in the end region 74. A latching means 84 of the end cap 82 latches into the recess 80 and avoids the end cap 82 being detached from the wiper strip element 20. The end cap 82 therefore closes the wiper strip unit 10 in the longitudinal direction 24.

What is claimed is:

1. A wiper device, having a wiper strip unit (10) which has a wiper strip element (20) with a longitudinal guide channel (12) for guiding a carrier element (14), characterized in that the longitudinal guide channel (12) comprises a longitudinal opening (16) which extends at least over a greater part of the wiper strip element (20), the wiper device further including a wiper blade adapter (26) coupled to the wiper strip element (20), wherein the carrier element (14) extends through a cutout of the wiper blade adapter (26) and is guided therein over an entire length of the wiper blade adapter (26), and wherein the wiper strip element (20) has a single fastening recess (22) that forms a positive locking connection with the wiper blade adapter (26), wherein the single fastening recess (22) has different lengths on opposite sides of the wiper strip element (20).

2. The wiper device as claimed in claim 1, characterized in that the longitudinal guide channel (12) is open toward a receiving region (58) of a wind deflector element (60).

3. The wiper device as claimed in claim 1, characterized in that the longitudinal opening (16) extends over the entire longitudinal guide channel (12).

4. The wiper device as claimed in claim 1, characterized in that the wiper strip element (20) is produced at least in an extrusion process.

5. The wiper device as claimed in claim 1, characterized by a wind deflector element (60) which is provided, in a mounted state, for forming a positive locking connection with the wiper strip element (20).

6. The wiper device as claimed in claim 5, characterized in that the wind deflector element (60) includes two fastening walls (68, 70), wherein the two fastening walls (68, 70) extend laterally inwardly toward one another.

7. The wiper device as claimed in claim 6, wherein the wind deflector element (60) includes a spoiler (64) and a spoiler rail (66) coupled to the spoiler (64), the fastening walls (68, 70) forming part of the spoiler rail (66).

8. The wiper device at least as claimed in claim 5, characterized in that the wind deflector element (60) is produced in a coextrusion process.

9. The wiper device as claimed in claim 1, characterized in that the wiper strip element (20) has at least two fastening means (54, 56), free ends of which point in directions which face away from one another, and which free ends are provided for forming a positively locking connection with a wind deflector element (60).

10. The wiper device as claimed in claim 1, characterized in that the wiper strip unit (10) comprises at least one end cap (82) which is provided for closing off the wiper strip unit (10) in a longitudinal direction (24).

11. The wiper device as claimed in claim 1, wherein the longitudinal guide channel defines a longitudinal opening (16) extending along the wiper strip element (20), wherein the longitudinal guide channel (12) is defined by a lower wall (40), two side walls (42, 44) that extend up from the lower wall (40) at opposing ends of the lower wall (40), two top walls that extend inwardly from the side walls (42, 44) and toward one another, and two L-shaped guide profiles (46, 48) which extend from the two top walls, wherein each L-shaped guide profile includes a first wall (50, 52) that extends perpendicular to the lower wall (40) and a second wall (54, 56) that extends from the first wall (50, 52) and parallel to the lower wall (40), wherein the second walls (54, 56) extend away from the first walls (50, 52) in opposing directions relative to one another, so as to form receiving channels between the second walls (54, 56) and the top walls.

12. The wiper device as claimed in claim 11, further comprising a wind deflector element (60) which is provided, in a mounted state, for forming a positive locking connection with the wiper strip element (20), wherein the wind deflector element (60) includes two fastening walls (68, 70), wherein the two fastening walls (68, 70) extend laterally inwardly toward one another and in the mounted state extend into the receiving channels.

13. The wiper device as claimed in claim 1, wherein the longitudinal opening (16) extends along a longitudinal direction (24), and wherein the single fastening recess (22) is arranged centrally along the longitudinal direction (24).

* * * * *